Figure 1:
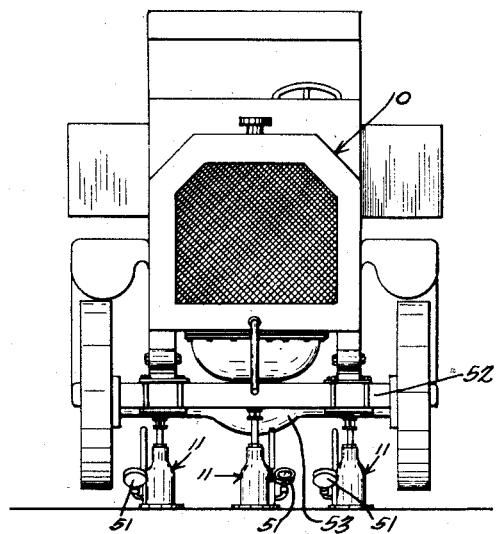

Oct. 20, 1931.  C. W. BRAND  1,828,022

SCALE

Filed May 26, 1928

Carl W. Brand
Inventor by Smith and Freeman
Attorneys

Patented Oct. 20, 1931

1,828,022

UNITED STATES PATENT OFFICE

CARL W. BRAND, OF CLEVELAND HEIGHTS, OHIO

SCALE

Application filed May 26, 1928. Serial No. 280,853.

Figure 2:
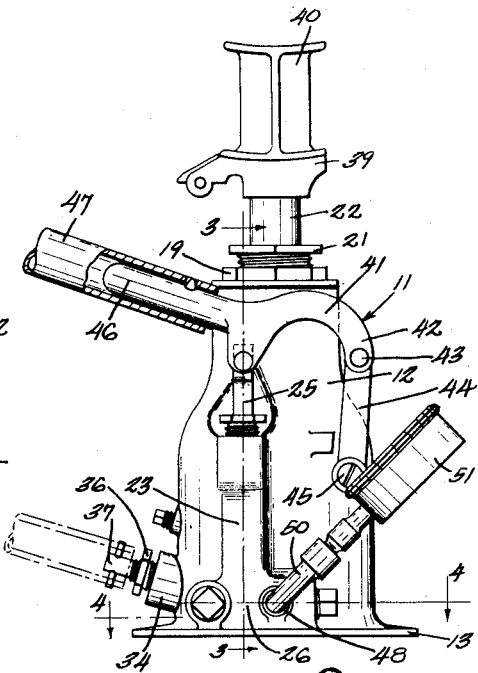
Figure 3:
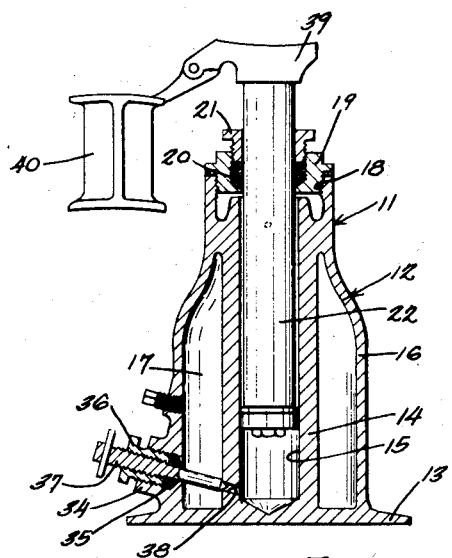
Figure 4:
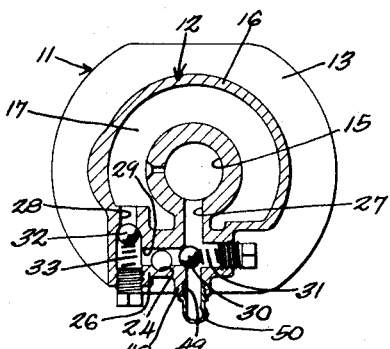

My invention relates to scales, and particularly to portable scales particularly designed to be used for weighing automobile trucks and the like, and the principal object of my invention is to provide a new and improved device of this type. In the drawings accompanying this specification and forming a part of this application I have shown, for purposes of illustration, one form which my invention may assume, and in these drawings:

Figure 1 is a general view showing this form of my invention in use on a truck,

Figure 2 s a side elevation of this form of my invention, with parts broken away, Figure 3 is a vertical section, while Figure 4 is a section on the line 4—4 of Figure 2.

My invention is shown herein as applied to a truck 10, and as holding the truck 10 raised from the ground by three similar scales 11, one scales 11 applied under the center of the front axle 52, the other two scales 11 positioned under the rear axle housing 53 just inside each wheel.

Each scales 11 herein shown comprises a body 12 comprising a base 13 from which rise an inner cylindrical wall 14 forming a piston cylinder 15 and an outer wall 16 cylindrical and spaced from the inner cylindrical wall 14 at the base 13 but tapering at its upper part ultimately to join the inner cylindrical wall 14 and form therewith an annular reservoir 17 for the oil or other suitable fluid employed in the scales. Above its junction with the inner wall 14 the outer wall 16 is internally screw-threaded at 18 to receive a packing nut 19 receiving packing 20 and a gland nut 21 and serving thus to seal the opening through which emerges a piston 22 which reciprocates in the piston cylinder 15. The body 12 is also provided with an integral pump cylinder 23 containing a plunger bore 24 receiving a plunger 25 emerging through the upper open end of the cylinder 23. The lower end of the cylinder 23 communicates with a valve body 26 providing two ports 27 and 28, port 27 furnishing communication between the base of the piston cylinder 15 and a connecting passage 29 in communication with the bore 24 of the pump cylinder 23, and port 28 furnishing communication between this same connecting passage 29 and the reservoir 17, the passage of the liquid from the piston cylinder 15 toward the pump cylinder 23 being prevented by a ball check 30 held in place by a spring 31, and the passage of liquid from the pump cylinder 23 toward the reservoir 17 being prevented by a ball check 32 seated by a spring 33.

It is obvious, therefore, that operation of the pump plunger 25 will draw liquid from the reservoir 17 and force it into the piston cylinder 15.

A boss 34 forming a stuffing box for receiving a packing 35, a gland nut 36, and a relief valve stem 37 threaded into the gland nut 36, are provided on the body 12, and the valve stem 37 extends through the reservoir chamber 17 and controls a relief opening 38 establishing communication between the reservoir chamber 17 and the bottom part of the piston cylinder 15 and serving to permit reflow of the fluid from the piston cylinder 15 back into the reservoir 17, and consequent descent of the piston 22; the upper end of the piston 22 is provided with a head 39 itself provided with an extension 40 pivotally connected to the head 39 to be swung into position above the head 39 when additional length is required; while the pump plunger 25 is operated by a pump lever 41 which has a rearwardly extending portion 42 pivoted at 43 to a link 44 pivoted at 45 to the body 12, and has also an outwardly extending arm 46 over which engages a hollow handle 47.

In a boss 48 on the body 12 is provided an aperture 49 to which is screw-threadedly attached a tube 50 extending outwardly for a short distance and then upwardly at an angle of approximately 45° with the ground, and at the top of this tube 50 is screw-threadedly mounted a gage 51 which may be of any of the ordinary types of pressure gages but preferably is graduated to read directly the weight supported on the piston 22.

In use the operator seats the valve stem 37 in the relief opening 38, thereby preventing any discharge from the piston cylinder 15 to the reservoir chamber 17, applies the handle 47 to the arm 46, and then proceeds to manipulate the oil pump with the head 39 below the part to be elevated. By this operation fluid alternately is drawn in through the port 28 past the check 32 into the bore 24 of the pump cylinder 23 and then forced past the check 30 through the port 27 into the piston cylinder 15 below the piston 22, thereby elevating the piston 22. To release the piston 22 the operator rotates the valve stem 37 to a release position thus permitting the oil under the piston 22 to pass back into the reservoir 18 and the piston 22 to descend.

It will be apparent to one skilled in the art that the weight supported by the head 39 will at all times exert the same pressure on the fluid in the tube 50 on which the gage 51 is mounted as it exerts on the oil supporting the piston 22 and accordingly that by accurately calibrating the gage 51 the weight of the object supported on the head 39 may be accurately determined by the pressure registered on the indicator on the gage 51, which may be denominated in pounds or any desired unit for measuring weight. It also will be apparent to one skilled in the art that by using three similar scales 11 each provided with a gage 51, applying one scales 11 under the middle of the front axle 52 and two scales 11 under the rear axle housing 53 one inside each rear wheel, that the total weight of the truck supported thereby will be equal to the sum of the weights indicated by the three gages. It also will be apparent to one skilled in the art that the use of the scales herein shown is not limited to weighing trucks, or to weighing trucks in the manner indicated.

Under these circumstances those skilled in the art will realize that I have produced a new and improved scales, and accordingly that I have accomplished at least the principal object of my invention. At the same time those skilled in the art will realize that the particular embodiment of my invention herein shown and described embodies advantages other than those specifically pointed out or suggested herein, and also that this particular embodiment of my invention may be variously changed and modified without departing from the spirit of my invention or sacrificing these advantages, wherefore it will be understood that the disclosure herein is illustrative only, and that my invention is not limited thereto.

I claim:—

1. A portable scale and hydraulic jack unit, comprising: a hydraulic jack having a fluid reservoir, a cylinder, a piston adapted to be engaged with an object to be lifted, a pump, and valve means operable to effect withdrawal of said fluid from said reservoir and to supply said fluid to said cylinder when said pump is operated, and means communicating with the fluid in said cylinder and operable by the pressure of said fluid for indicating the weight of the object so lifted.

2. A portable scale and hydraulic jack unit, comprising: a hydraulic jack having a fluid reservoir, a cylinder, a piston adapted to be engaged with an object to be lifted, a pump having a manually operable handle, and valve means operable to effect withdrawal of said fluid from said reservoir and to supply said fluid to said cylinder when said pump is operated, and gauge means communicating with the fluid in said cylinder and operable by the pressure of said fluid for indicating the weight of said object so lifted, said gauge means having graduations disposed in a direction to be visible to the operator of said pump handle.

3. A portable scale and hydraulic jack unit, comprising: a hydraulic jack having a base portion, a reservoir carried by said base, a fluid pressure cylinder disposed within said reservoir, a ram reciprocably mounted within said cylinder, a pump for withdrawing fluid from said reservoir and forcing the same into said cylinder beneath said ram, and a pressure gauge carried by said base and communicating with said ram cylinder beneath said ram.

4. A portable scale and hydraulic jack unit, comprising: a hydraulic jack having a base portion, a reservoir carried by said base, a fluid pressure cylinder disposed within said reservoir, a ram reciprocably mounted within said cylinder, a pump for withdrawing fluid from said reservoir and forcing the same into said cylinder beneath said ram, a passage in said base communicating with said cylinder beneath said ram, and a pressure gauge carried by said base and communicating with said passage.

5. A portable scale and hydraulic jack unit, comprising: a hydraulic jack having a base portion, a reservoir carried by said base, a fluid pressure cylinder disposed within said reservoir, a ram reciprocably mounted within said cylinder, a pump for withdrawing fluid from said reservoir and forcing the same into said cylinder beneath said ram, a boss formed integrally with said base and having a passage therein communicating with said cylinder beneath said ram, and a pressure gauge carried by said boss and communicating with said passage.

6. A portable scale and hydraulic jack unit, comprising: a hydraulic jack having a base portion, a reservoir carried by said base, a fluid pressure cylinder disposed within said reservoir, a ram reciprocably mounted within said cylinder, a pump for withdrawing fluid from said reservoir and forcing the same into said cylinder beneath said ram, a passage in said base for establishing communication between said pump and said cylinder beneath said ram, a check-valve for preventing the back-flow of fluid from said passage to said pump, and a pressure gauge carried by said base and communicating with said passage.

7. A portable scale and hydraulic jack unit, comprising: a hydraulic jack having a base portion, a reservoir carried by said base, a fluid pressure cylinder disposed within said reservoir, a ram reciprocably mounted within said cylinder, a pump for withdrawing fluid from said reservoir and forcing the same into said cylinder beneath said ram, a boss formed integrally with said base and having a first passage therein communicating with said cylinder beneath said ram and with said pump, a second passage communicating with said reservoir and said pump, a check-valve disposed in said first passage to prevent the back-flow of fluid from said cylinder to said pump, a second check-valve disposed in said second passage to prevent the back-flow of fluid from said pump to said reservoir, and a pressure gauge carried by said boss and communicating with said first passage for indicating the force exerted by said ram.

In testimony whereof I hereunto affix my signature.

CARL W. BRAND.